United States Patent
Komata

(10) Patent No.: US 6,771,251 B2
(45) Date of Patent: Aug. 3, 2004

(54) ELECTRONIC EQUIPMENT, RECORDING MEDIUM AND METHOD FOR CHANGING PARAMETER SETTINGS OF THE ELECTRONIC EQUIPMENT OR COMPUTER

(75) Inventor: Nobuhiro Komata, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 63 days.

(21) Appl. No.: 09/758,043

(22) Filed: Jan. 10, 2001

(65) Prior Publication Data

US 2001/0008351 A1 Jul. 19, 2001

(30) Foreign Application Priority Data

Jan. 14, 2000 (JP) ...................................... 2000-040271

(51) Int. Cl.[7] .............................. G09G 5/00; G09G 5/08
(52) U.S. Cl. ...................................... 345/156; 345/159
(58) Field of Search ................................ 345/156, 159, 345/169, 173, 174, 101; 99/280; 338/69; 340/901; 341/34; 369/47.1; 386/38; 463/37

(56) References Cited

U.S. PATENT DOCUMENTS

| | | | |
|---|---|---|---|
| 5,454,037 A | * 9/1995 | Pacella | 379/451 |
| 5,515,074 A | * 5/1996 | Yamamoto | 345/101 |
| 5,542,039 A | 7/1996 | Brinson et al. | |
| 5,687,331 A | 11/1997 | Volk et al. | |
| 5,729,213 A | * 3/1998 | Ferrari et al. | 340/901 |
| 5,739,809 A | * 4/1998 | McLaughlin et al. | 345/594 |
| 6,208,271 B1 | * 3/2001 | Armstrong | 341/34 |
| 6,347,997 B1 | * 2/2002 | Armstrong | 463/37 |
| 6,404,584 B2 | * 6/2002 | Armstrong | 360/88 |
| 6,415,108 B1 | * 7/2002 | Kamishima et al. | 396/312 |
| 6,415,707 B1 | * 7/2002 | Armstrong | 99/280 |
| 6,587,119 B1 | * 7/2003 | Anderson et al. | 345/672 |

FOREIGN PATENT DOCUMENTS

| | | |
|---|---|---|
| EP | 0 854 414 A1 | 7/1998 |
| JP | 09297650 | 11/1997 |
| TW | 288636 | 10/1996 |

OTHER PUBLICATIONS

Desposito et al. Complete projection TV trouble shooting &repair 1998 PROMPT Publication pp. 127, 131–134, 163–165, 169.*
Eugene Trundle, 1988, 1996, Reed educational and professional publishing Ltd. pp. V, 116–21.*
Maxim, Sensor signal conditioners, NAX 1457 1999.*
Eugene Trundle, Guide to TV and Video technology, 1988, p. 118, paragraph 3 to p. 119, paragraph 119,.*

* cited by examiner

*Primary Examiner*—Vijay Shankar
*Assistant Examiner*—Prabodh M. Dharia
(74) *Attorney, Agent, or Firm*—Katten Muchin Zavis Rosenman

(57) ABSTRACT

An electronic equipment which provides an easier-to-use interface for the changing of the settings of various parameters on an LCD panel or the screen of a computer by the pushing by a user of a simple ON/OFF switch or holding it down, includes a switch connected to a pressure-sensitive unit, a processing circuit that performs processing depending on an output value of the switch, and a display unit that displays the results of processing of the processing circuit. The processing circuit changes the settings of parameters of electronic equipment in increments depending on the output value of the switch.

22 Claims, 17 Drawing Sheets

| | PRESSURE-SENSE VALUE | SETTING |
|---|---|---|
| SCREEN BRIGHTNESS | 0 | 0 |
| | 1 | 1 |
| | ⋮ | ⋮ |
| | 2 5 5 | 2 5 5 |
| SOUND VOLUME | 0 ~ 1 | 0 |
| | 2 ~ 3 | 1 |
| | ⋮ | ⋮ |
| | 2 5 4 ~ 2 5 5 | 1 2 7 |

ELECTRONIC EQUIPMENT, RECORDING MEDIUM AND METHOD FOR CHANGING PARAMETER SETTINGS OF THE ELECTRONIC EQUIPMENT OR COMPUTER

FIELD OF THE INVENTION

The present invention relates to electronic equipment, recording medium and a method of changing parameter settings on an LCD panel or a screen of a computer.

BACKGROUND OF THE INVENTION

A conventional method of changing various settings (parameters) used in software or the like on the LCD panel of a device or the screen of a computer involves pushing switches, keyboard keys or other types of switches or holding same down by a user. Normally, a user's push of a switch puts the device into a setting change mode and if the switch held down, the setting is incremented or decremented as long as the switch is held down.

On the other hand, so-called pressure-sensitive controllers are used as input devices for electronic equipment represented by computers, and as input devices for entertainment systems represented by game machines, for example. A pressure-sensitive controller is a unit wherein, when pressure is applied with a finger of a user directly to a control element connected to a pressure-sensitive device, the pushing pressure is provided as a pressure-sensing value output. A specific structure thereof is, for example, a pressure-sensitive type controller disclosed in the publication of Japanese utility model application No. JP-B-H1-40545, wherein pressure-sensitive output is provided as input to a VCO (variable control oscillator) and the output of the VCO is used for repeated fire in a game.

SUMMARY OF THE INVENTION

It is an object of the present invention to make the changing of setpoints for various parameters on an LCD panel or the screen of a computer by means of the pushing or continuous pushing of a simple ON/OFF switch by a user into an easier-to-use interface for users.

This and other objects of the present invention are attained by electronic equipment which comprises a switch connected to pressure-sensitive means, a processing circuit that performs processing depending on an output value of the switch, and display means that displays the results of processing of the processing circuit, wherein the processing circuit changes settings of parameters on the display means, depending on the output value of the switch.

A recording medium according to the present invention is suggested, on which is recorded a computer-readable and executable software program that performs processing by taking as instructions an output from a controller which has pressure-sensitive means, wherein the software program changes settings depending on the output value of the controller.

A method of changing the settings of parameters of electronic equipment according to the present invention comprises the steps of: sensing the pushing pressure by a user by pressure-sensitive means, generating a pressure-sensing output signal corresponding to the pushing pressure, changing settings of electronic equipment or a computer by increments that depend on the magnitude of the pressure-sensing output signal, and displaying the changed value of the setting on a monitor of the electronic equipment or the computer.

Moreover, the method of changing the settings of parameters of electronic equipment according to the present invention may comprise the steps of sensing the pushing pressure of a user by pressure-sensitive means, generating a pressure-sensing output signal corresponding to the pushing pressure, changing settings of a computer by increments that depend on a percent change between a previous pressure-sensing output signal and a current pressure-sensing output signal, and displaying the changed value of the setting on a monitor of the computer.

DESCRIPTION OF THE PREFERRED EMBODIMENT

In a controller that uses a pressure-sensitive device, when the button which is the control element is pushed by a user, not only the presence of pressure-sensing output is detected, for example, as the ON/OFF of a switch, but also a pressure-sensing value output which depends on the pushing pressure of the user is also obtained. On the other hand, in software or games that use a pressure-sensing value output, various processing or actions can be entered depending on the pressure-sensing value output. In this embodiment, even when setting parameters on the screen by operating a control element, it is possible to change the settings of parameters depending on the pressure-sensing values based on the pushing-pressure operation of various control elements.

In the present embodiment, various parameters are set with values corresponding to the pressure-sensing values output when a controller which has a pressure-sensitive device is operated. Thereby, it is possible to provide a system with a user interface that is improved in comparison to the conventional case wherein parameters are set depending on the repetition of the ON action of a simple ON/OFF switch or the duration thereof.

Figure 1:
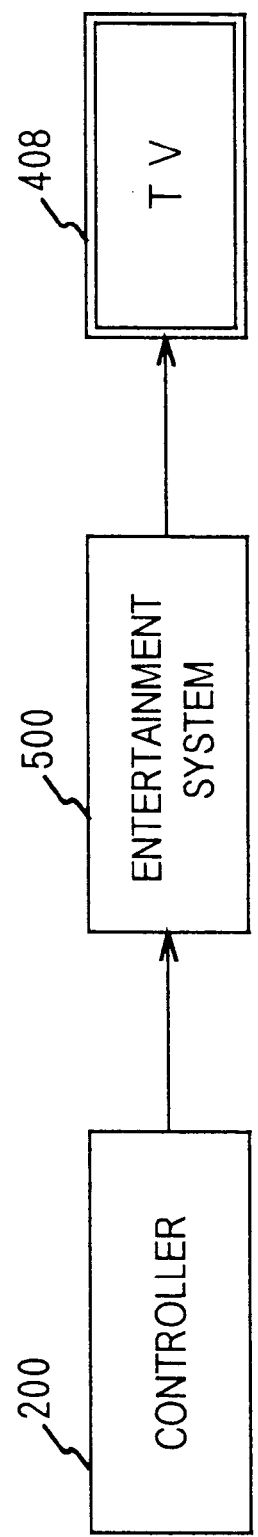
FIG. 1 shows a connection of a controller to an entertainment system to enable a user to enjoy game software or videos.
Figure 6:
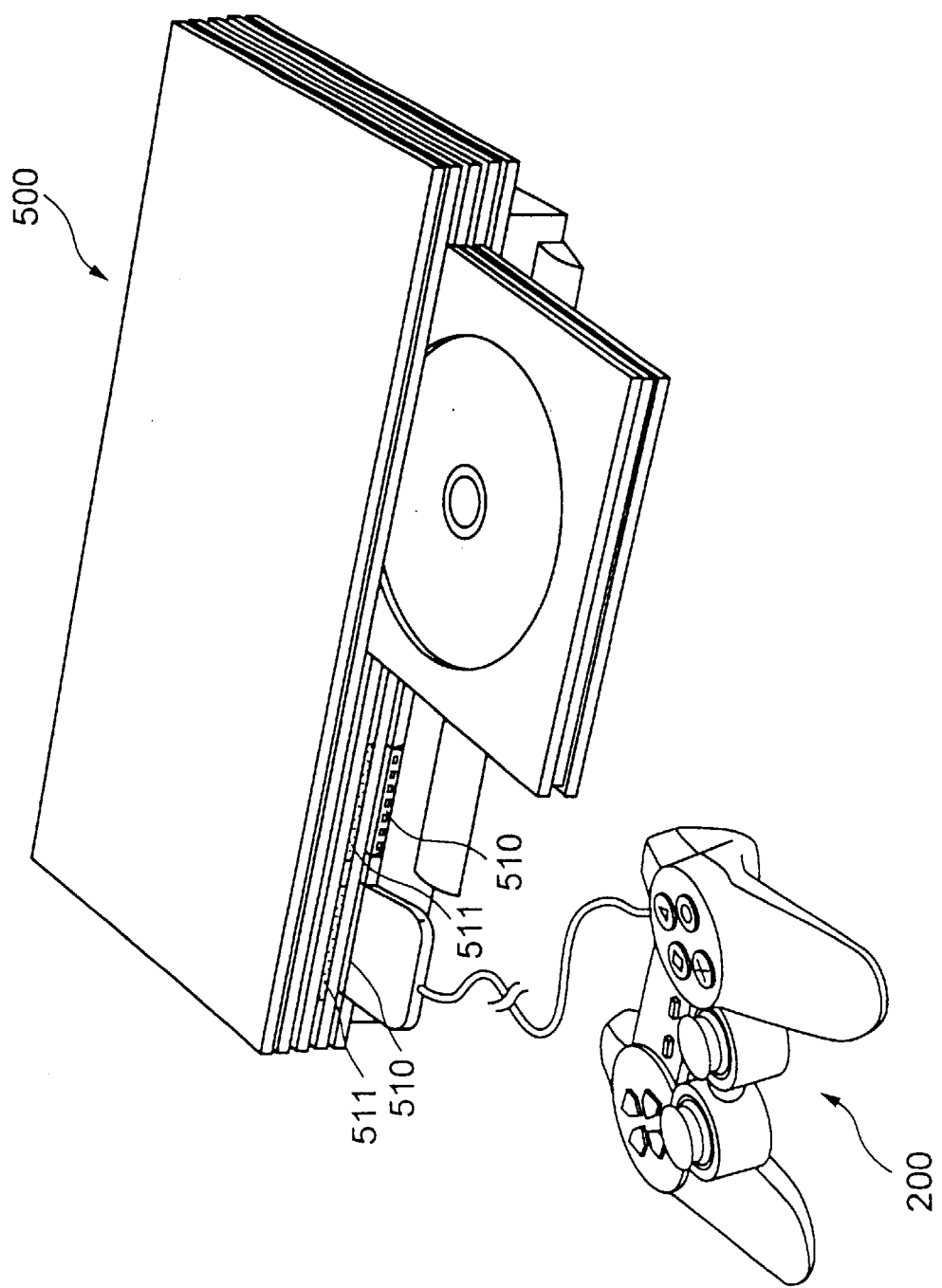
FIG. 6 is a perspective view of the controller connected to the entertainment system.

FIG. 1 shows a connection of a controller 200 to an entertainment system 500 to enable a user to enjoy game software or a video. More specific structure is shown in FIG. 6.

As shown in this FIG. 1, controller 200 which has buttons connected to pressure-sensitive devices of the controller is connected to entertainment system 500 used for playing games or enjoying DVD video or other types of video images, and the video output terminals of the entertainment system are connected to a television monitor 408. Here, the analog output from the pressure-sensitive devices is converted by an A/D converter to digital values in the range 0–255 and provided to the entertainment system 500.

With reference to FIGS. 2–5, here follows a description of the case of setting parameters by the operation of the controller 200.

Figures 2, 3:
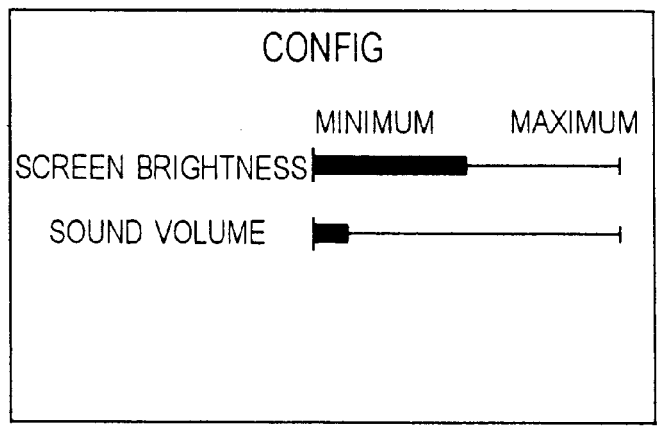
FIG. 2 shows a screen display known as a "CONFIG screen" for setting various parameters at the time of execution of software.
FIG. 3 is a diagram showing a pressure-sensing value-parameter setting conversion table for selecting settings corresponding to the various pressure-sensing values for the screen display shown in FIG. 2.

FIG. 2 shows an example of a screen display known as a "CONFIG screen" for setting various parameters at the time of execution of software, for example. This example is a CONFIG screen for setting the brightness of the monitor screen and the sound volume.

For example, previous software and the like had adopted a method whereby parameters are changed by repeatedly pushing an ON/OFF switch to increment or decrement the values of a parameter a single unit value or several unit values at a time. With this method, it is necessary to repeatedly push a button a number of times until the desired parameter is reached.

In this embodiment, the values of parameters are set depending on the magnitude of the pressure-sensing value from a pressure-sensitive controller.

FIG. 3 shows a pressure-sensing value-parameter setting conversion table for selecting settings corresponding to the pressure-sensing values 0–255 for the example shown in FIG. 2. For example, for the parameter of screen brightness, the pressure-sensing values 0 through 255 are allocated to the settings 0 through 255, respectively, and for the parameter of sound volume, the pressure-sensing values 0–1 through 254–255 are allocated to the settings 0 through 127, respectively.

Next, with reference to FIG. 4, the method of setting values depending on the pressure-sensing values will be described. As an example, we shall describe the case of FIGS. 2 and 3. We shall assume that the parameter whose setting is to be changed has been selected.

Figure 4:
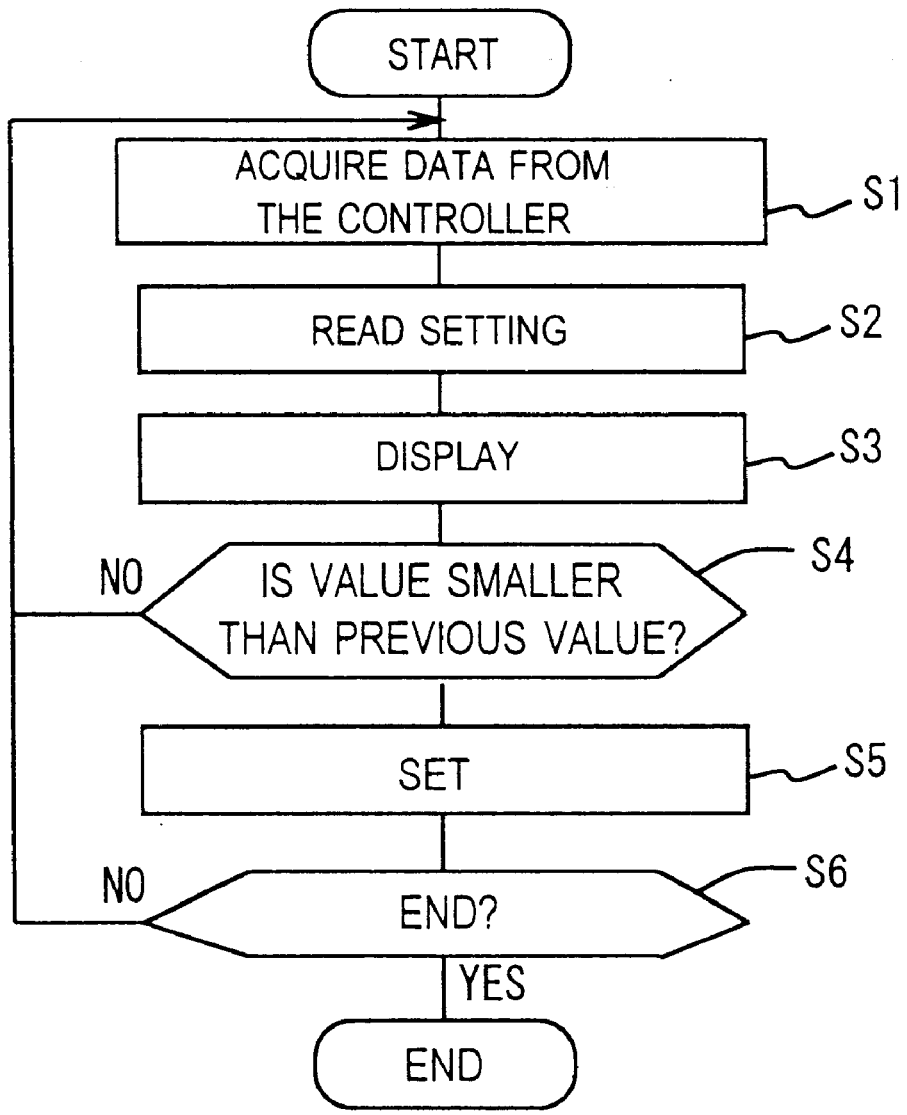
FIG. 4 is a flowchart showing the processing of a program for setting the values of parameters.

The flowchart shown in FIG. 4 shows the processing of a program for setting the value of a parameter.

In FIG. 4, in Step S1, the pressure-sensing value is acquired from the controller 200.

In Step S2, the parameter setting corresponding to the pressure-sensing value is read from the table shown in FIG. 3.

In Step S3, an image based on the new value of the parameter, namely an image of the bar graph shown in FIG. 2 updated to reflect the new parameter value, is generated and displayed on the television monitor 408.

In Step S4, a decision is made as to whether or not the value is less than the previous value, and if "YES" then control processing moves to Step S5. This process is intended to detect and fix the maximum value.

In Step S5, the new parameter value is stored in the stipulated storage location of the entertainment system 500, for example, a register or specified region of memory. The entertainment system 500 sets the screen brightness, namely the luminance value of the video signal, or the sound volume based on this stored parameter value.

In Step S6, a decision is made as to whether or not there is input from the user indicating the end, and if "YES" then processing ends. If "NO" then control procedure returns to Step S1.

As described above, with the present embodiment, a value is set depending on the pressure-sensing value, so the user interface can be improved compared to the case of selection with a simple ON/OFF switch.

It is to be noted that the above-described example relates to the case of selecting the value of a parameter depending on the magnitude of the pressure-sensing value. However, it is also possible to display the value of the parameter incremented or decremented at a rate that depends on the pressure-sensing value and by halting the pushing by user at the point in time that the desired value is displayed, the user thus selects and sets the value of the parameter.

In addition, it is also possible to find the percent change from the previous pressure-sensing value to the current pressure-sensing value, and have the value of the parameter be incremented or decremented after a number of frames which depends on this percent change. For example, if the previous pressure-sensing value is 100 and the current pressure-sensing value is 50, then the percent change is 50%, so the number of frames may be made twice the previous number of frames.

In addition, a table the reverse of that shown in FIG. 3, namely a table wherein low pressure-sensing values are allocated to large values may be used so that the value of the parameter gets lower the higher the pressure-sensing value becomes.

Figure 5:
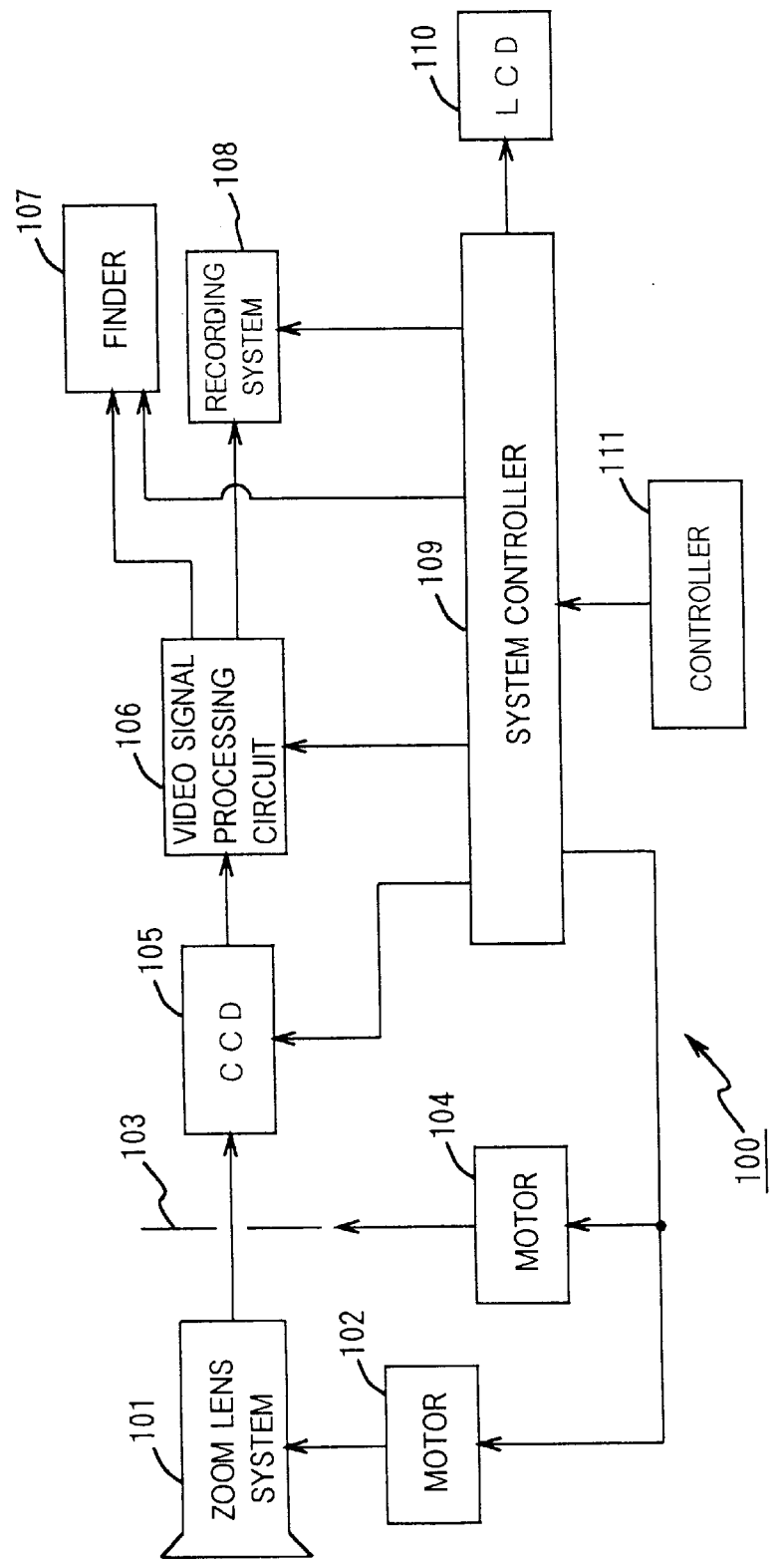
FIG. 5 is a circuit block diagram of a video camera.

FIG. 5 is a diagram used to describe another embodiment. In the embodiment shown in FIG. 5, pressure-sensing output is applied to the setting of parameters of a video camera used for taking still images or video images. The video camera shown in FIG. 5 has of a zoom lens system 101, a motor 102 for moving the zoom lens to perform zoom-in and zoom-out motions, an iris 103, a motor 104 for moving the iris to adjust the amount of incident light, a CCD (Charge Coupled Device) 105 for obtaining images from the light incident upon it, a video signal processing circuit 106 for turning the output from the CCD into composite, component, RGB or various other video signals, a recording system 108 for recording the video signal from the video signal processing circuit on a recording medium, a finder 107 for displaying the video signal from the video signal processing circuit 106, a system controller 109 that controls the entire unit, an LCD 110 that displays various parameters, and a controller 111 upon which is mounted pressure-sensitive switches for setting the values of parameters.

FIG. 6 is a diagram showing controller 200 connected to entertainment system 500. The controller 200 is removably connected to the entertainment system 500, and the entertainment system 500 is connected to television monitor 408.

The entertainment system 500 reads the program for a computer game from recording medium on which that program is recorded and by executing the program displays characters on the television monitor 408. The entertainment system 500 has various built-in functions for DVD (Digital Versatile Disc) playback, CDDA (compact disc digital audio) playback and the like. The signals from the controller 200 are also processed as one of the aforementioned control functions within the entertainment system 500, and the content thereof may be reflected in the movement of characters and the like, on the television monitor 408.

While this depends also on the content of the computer game program, controller 200 may be allocated functions for moving the characters displayed on the television monitor 408 in the directions up, down, left or right.

Figure 7:
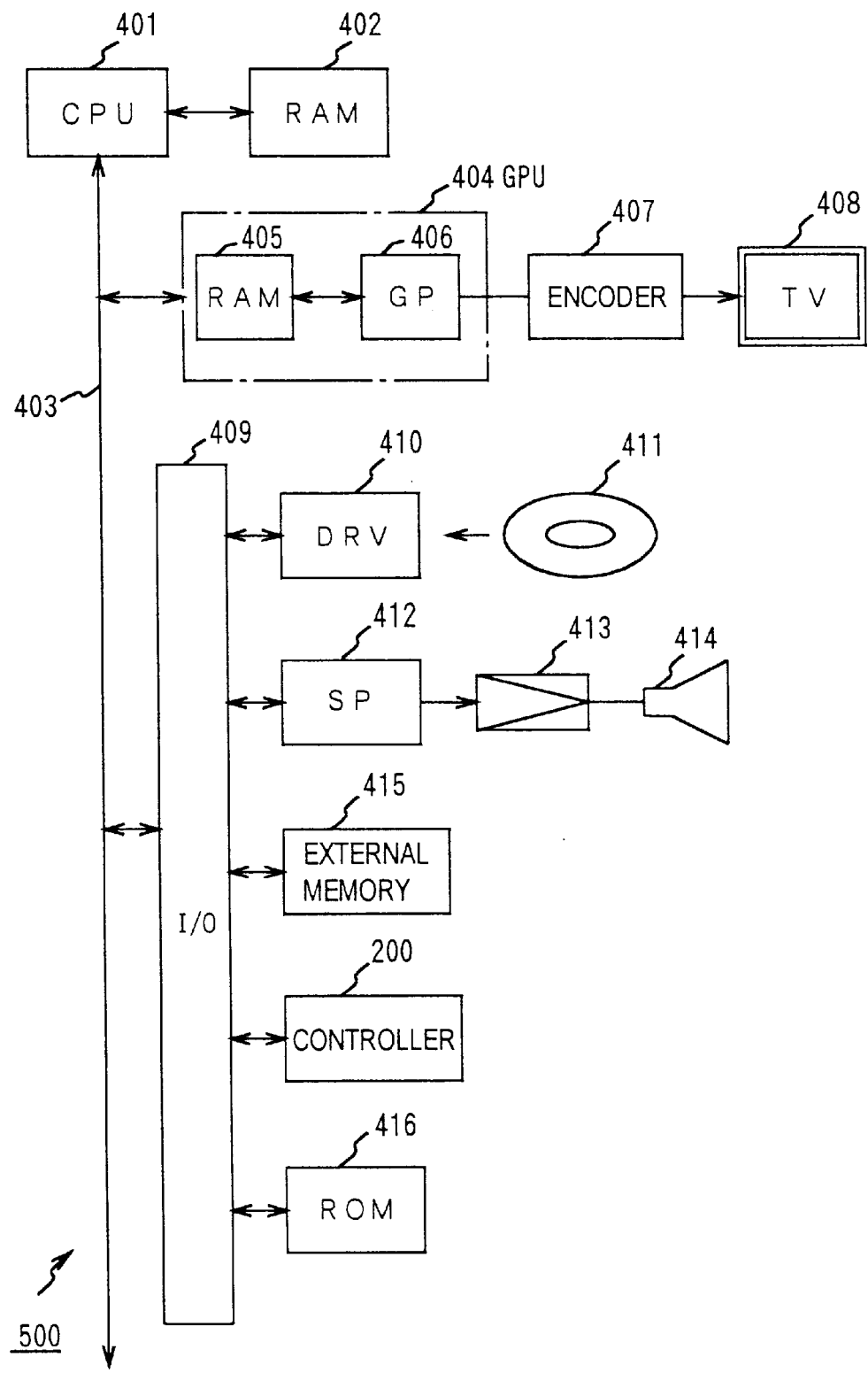
FIG. 7 is a block diagram of the entertainment system;.

With reference to FIG. 7, here follows a description of the interior of the entertainment system 500 shown in FIG. 6. FIG. 7 is a block diagram of the entertainment system 500.

A CPU 401 is connected to RAM 402 and a bus 403, respectively. Connected to bus 403 are a graphics processor unit (GPU) 404 and an input/output processor (I/O) 409, respectively. The GPU 404 is connected via an encoder 407 for converting a digital RGB signal or the like into the NTSC standard television format, for example, to a television monitor (TV) 408 as a peripheral.

Connected to the I/O 409 are a driver (DRV) 410 used for the playback and decoding of data recorded upon an optical disc 411, a sound processor (SP) 412, an external memory 415 consisting of flash memory, controller 200 and a ROM 416 which records the operating system and the like. The SP 412 is connected via an amplifier 413 to a speaker 414 as a peripheral.

Here, the external memory 415 may be a card-type memory consisting of a CPU or a gate array and flash memory, which is removably connected via a connector 511 to the entertainment system 500 shown in FIG. 6. The controller 200 is configured such that, when a plurality of buttons provided thereupon are pushed by a user, the controller gives instructions to the entertainment system 500.

In addition, the driver 410 is provided with a decoder for decoding images encoded based upon the MPEG standard.

The description will be made now as to how the images will be displayed on the television monitor 408 based on the operation of controller 200. It is assumed that data for objects consisting of polygon vertex data, texture data and the like recorded on the optical disc 411 is read by the driver 410 and stored in the RAM 402 of the CPU 401.

When instructions from the player via controller 200 are provided as an input to the entertainment system 500, the CPU 401 calculates the three-dimensional position and orientation of objects with respect to the point of view based on these instructions. Thereby, the polygon vertex data for objects defined by X, Y, Z coordinate values are modified variously. The modified polygon vertex data is subjected to perspective conversion processing and converted into two-dimensional coordinate data.

The regions specified by two-dimensional coordinates are so-called polygons. The converted coordinate data, Z data and texture data are supplied to the GPU 404. Based on this converted coordinate data, Z data and texture data, the GPU 404 performs the drawing process by writing texture data sequentially into the RAM 405. One frame of image data upon which the drawing process is completed, is encoded by the encoder 407 and then supplied to the television monitor 408 and displayed on its screen as an image.

Figure 8:
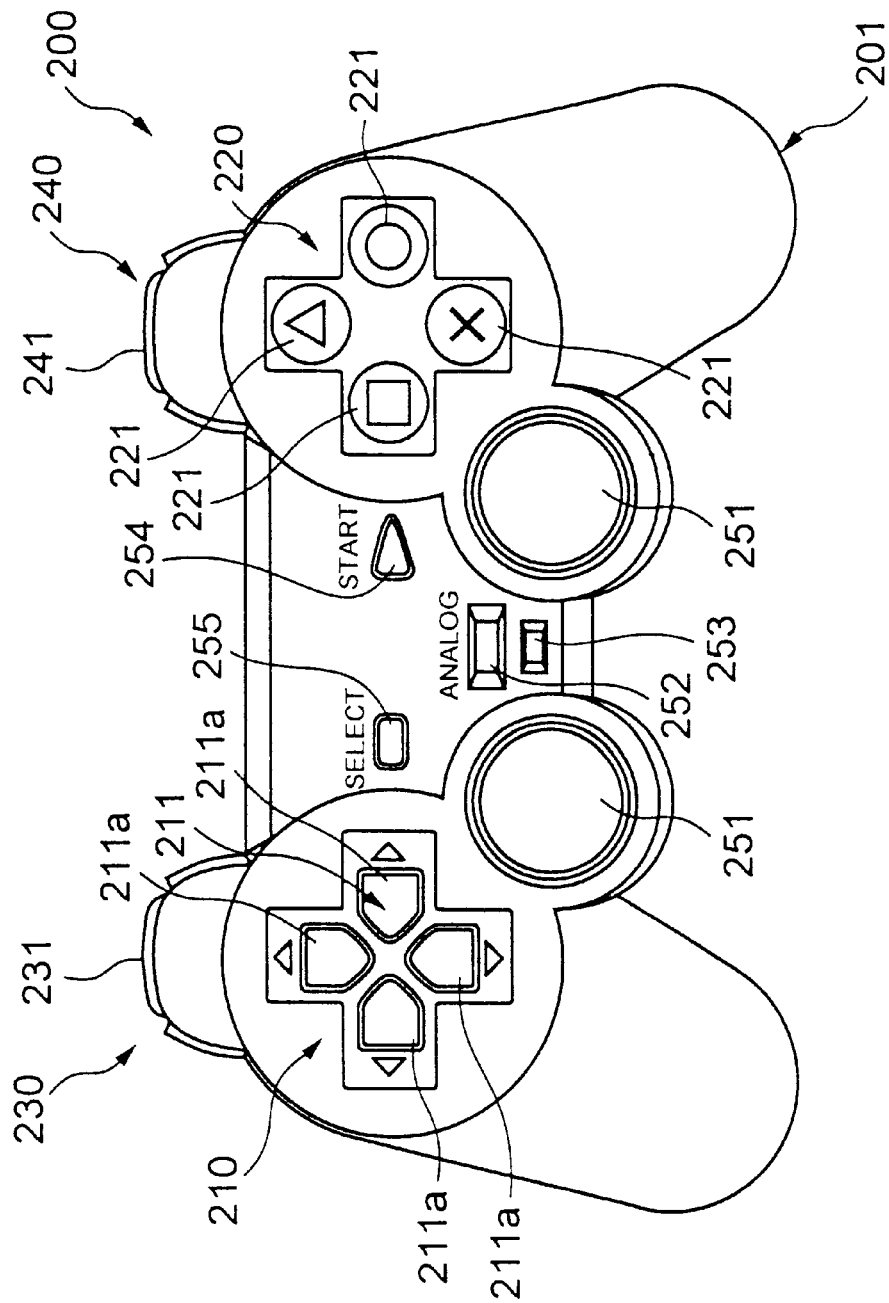
FIG. 8 is a top view of a controller.

FIG. 8 is a top view of controller 200. The controller 200 consists of a unit body 201 on the top surface of which are provided first and second control parts 210 and 220, and on the side surface of which are provided third and fourth control parts 230 and 240 of the controller 200.

The first control part 210 of the controller is provided with a cruciform control unit 211 used for pushing control, and the individual control keys 211a extending in each of the four directions of the control unit 211 form a control element. The first control part 210 is the control part for providing movement to the characters displayed on the screen of the television receiver, and has the functions for moving the characters in the up, down, left and right directions by pressing the individual control keys 211a of the cruciform control unit 211.

The second control part 220 is provided with four cylindrical control buttons 221 (control elements) for pushing control. The individual control buttons 221 have identifying marks such as "○" (circle), "X" (cross), "Δ" (triangle) and "□" (quadrangle) on their tops, in order to easily identify the individual control buttons 221.

The functions of the second control part 220 are set by the game program recorded upon the optical disc 411, and the individual control buttons 221 may be allocated functions that change the state of the game characters, for example. For example, the control buttons 221 may be allocated functions for moving the left arm, right arm, left leg and right leg of the character.

The third and fourth control parts 230 and 240 of the controller have nearly the same structure, and both are provided with two control buttons 231 and 241 (control elements) for pushing control, arranged above and below. The functions of these third and fourth control parts 230 and 240 are also set by the game program recorded on the optical disc, and may be allocated functions for making the game characters perform special actions, for example.

Moreover, two joy sticks 251 for performing analog operation are provided upon the unit body 201 shown in FIG. 8. The joy sticks 251 can be switched and used instead of the first and second control parts 210 and 220 described above. This switching is performed by means of an analog selection switch 252 provided upon the unit body 201. When the joy sticks 251 are selected, a display lamp 253 provided on the unit body 201 lights, indicating the state wherein the joy sticks 251 are selected.

It is to be noted that on unit body 201 there are also provided a start switch 254 for starting the game and a select switch 255 for selecting the degree of difficulty or the like at the start of a game, and the like.

The controller 200 is held by the left hand and the right hand of the user and is operated by the other fingers, and in particular the user's thumbs are able to operate most of the buttons on the top surface.

FIG. 9 and FIGS. 10A–10C are respectively, an exploded perspective view and cross-sectional views showing the second control part of the controller.

Figure 9:
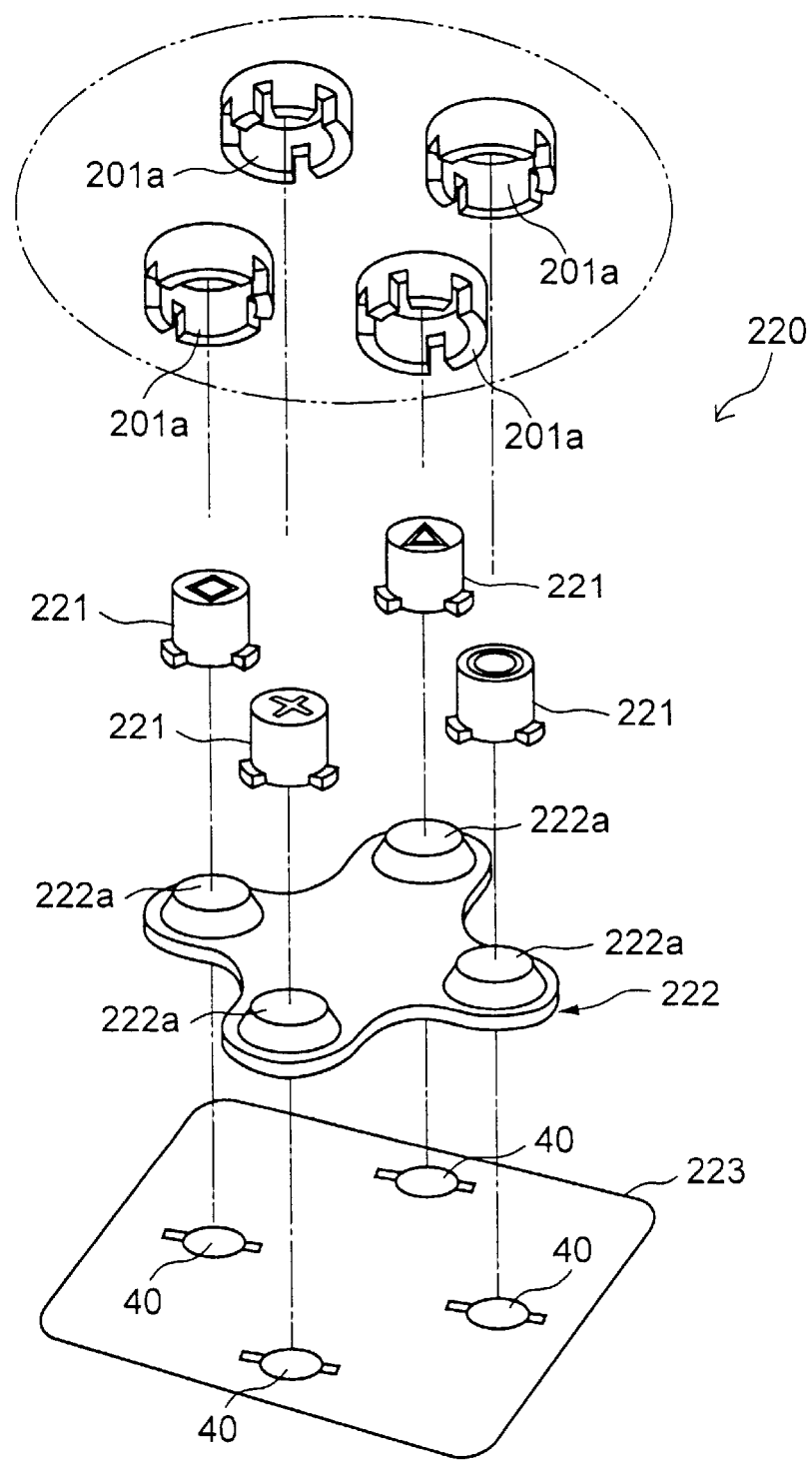
FIG. 9 is an exploded perspective view of the second control part of the controller.

As shown in FIG. 9, the second control part 220 consists of four control buttons 221 which serve as the control elements, an elastic body 222, and a sheet member 223 provided with resistors 40. The individual control buttons 221 are inserted from behind through insertion holes 201a formed on the upper surface of the unit body 201. The control buttons 221 inserted into the insertion holes 201a are able to move freely in the axial direction.

The elastic body 222 is made of insulating rubber or the like and has elastic areas 222a which protrude upward, and the lower ends of the control buttons 221 are supported upon the upper walls of the elastic areas 222a. When the control buttons 221 are pressed, the inclined-surface portions of these elastic areas 222a flex so that the upper walls move together with the control buttons 221. On the other hand, when the pushing pressure on the control buttons 221 is released, the flexed inclined-surface portions of elastic areas 222a elastically return to their original shape, pushing up the control buttons 221.

Figure 10A:
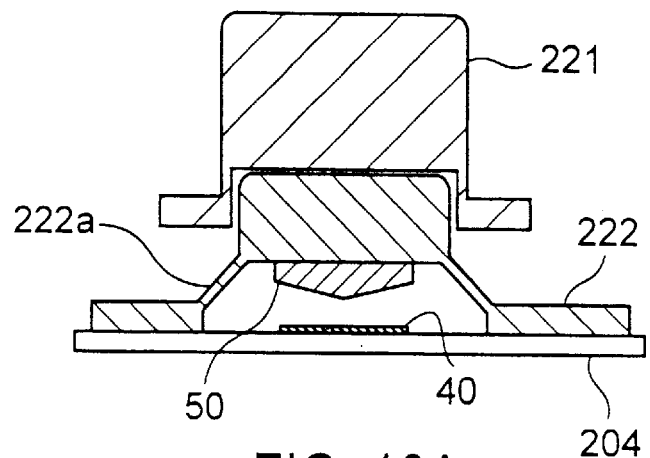
FIGS. 10A–10C are cross sectional views of the second control part of the controller of FIG. 9.
Figure 10B:
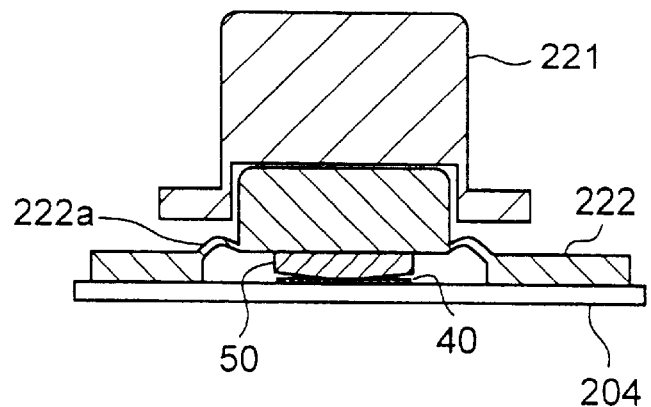
Figure 10C:
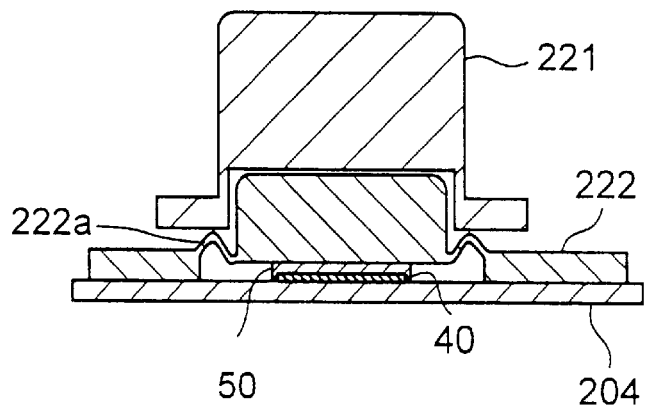

The elastic body 222 functions as a spring means whereby control buttons 221 which had been pushed in by a pushing action are returned to their original positions. As shown in FIGS. 10A–10C, conducting members 50 are attached to the rear surface of the elastic body 222.

The sheet member 223 consists of a membrane or other thin sheet material which has flexibility and insulating properties. Resistors 40 are provided in appropriate locations on this sheet member 223 and these resistors 40 and conducting member 50 are each disposed such that they face one of the control buttons 221 via the elastic body 222. The resistors 40 and conducting members 50 form pressure-sensitive devices. These pressure-sensitive devices consisting of resistors 40 and conducting members 50 have resistance values that vary depending on the pushing pressure received form the control buttons 221.

To describe this in more detail, as shown in FIGS. 10A–10C, the second control part 220 is provided with control buttons 221 as control elements, an elastic body 222, conducting members 50 and resistors 40. Each conducting member 50 may be made of conductive rubber which has elasticity, for example, and has a conical shape with its center as a vertex. The conducting members 50 are adhered to the inside of the top surface of the elastic areas 222a formed in the elastic body 222.

In addition, the resistors 40 may be provided on an internal board 204, for example, opposite the conducting members 50, so that the conducting members 50 come into contact with resistors 40 together with the pushing action of the control buttons 221.

The conducting member 50 deforms, depending on the pushing force on the control button 221 (namely the contact pressure with the resistor 40), so as shown in FIG. 10B and 10C, the surface area in contact with the resistor 40 varies depending on the pressure.

To wit, when the pressing force on the control button 221 is weak, as shown in FIG. 8B, only the area near the conical tip of the conducting member 50 is in contact. As the pressing force on the control button 221 becomes stronger, the tip of the conducting member 50 deforms gradually so the surface area in contact expands.

Figure 11:
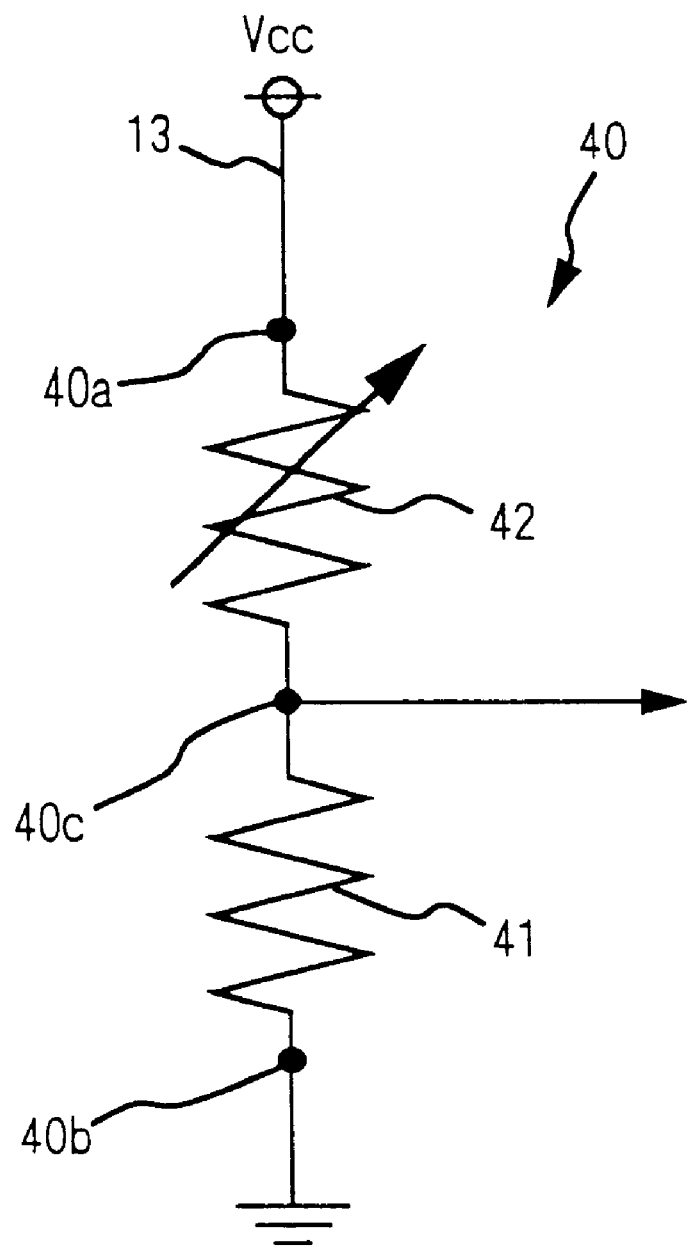
FIG. 11 is a diagram showing an equivalent circuit for a pressure-sensitive device.

FIG. 11 is a diagram showing an equivalent circuit for a pressure-sensitive device consisting of a resistor 40 and conducting member 50. As shown in this diagram, the pressure-sensitive device is inserted in series in a power supply line 13, where the voltage $V_{cc}$ is applied between the electrodes 40a and 40b. As shown in this diagram, the pressure-sensitive device is divided into a variable resistor 42 that has the relatively small resistance value of the conducting member 50, and a fixed resistor 41 that has the relatively large resistance value of the resistor 40.

Among these, the portion of the variable resistor 42 is equivalent to the portion of resistance in the contact between the resistor 40 and the conducting member 50, so the resistance value of the pressure-sensitive device varies depending on the surface area of contact with the conducting member 50.

When the conducting member 50 comes into contact with the resistor 40, in the portion of contact, the conducting member 50 becomes a bridge instead of the resistor 40 and a current flows, so the resistance value becomes smaller in the portion of contact. Therefore, the greater the surface area of contact between the resistor 40 and conducting member 50, the lower the resistance value of the pressure-sensitive device becomes. In this manner, the entire pressure-sensitive device can be understood to be a variable resistor. Note that FIGS. 10A–10C show only the contact portion between the conducting member 50 and resistor 40 which forms the variable resistor 42 of FIG. 11, but the fixed resistor of FIG. 11 is omitted form FIGS. 10A–10C.

In the preferred embodiment, an output terminal is provided near the boundary between the variable resistor 42 and fixed resistor 41, namely near the intermediate point of the resistors 40, and thus a voltage stepped down from the applied voltage $V_{cc}$ by the amount the variable resistance is extracted as an analog signal corresponding to the pushing pressure by the user on the control button 221.

First, since a voltage is applied to the resistor 40 when the power is turned on, even if the control button 221 is not pressed, a fixed analog signal (voltage) $V_{min}$ is provided as the output from the output terminal 40c. Next, even if the control button 221 is pressed, the resistance value of this resistor 40 does not change until the conducting member 50 contacts the resistor 40, so the output from the resistor 40 remains unchanged at $V_{min}$.

If the control button 221 is pushed further and the conducting member 50 comes into contact with the resistor 40, the surface area of contact between the conducting member 50 and the resistor 40 increases in response to the pushing pressure on the control button 221, and thus the resistance of the resistor 40 is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed.

Figure 12:
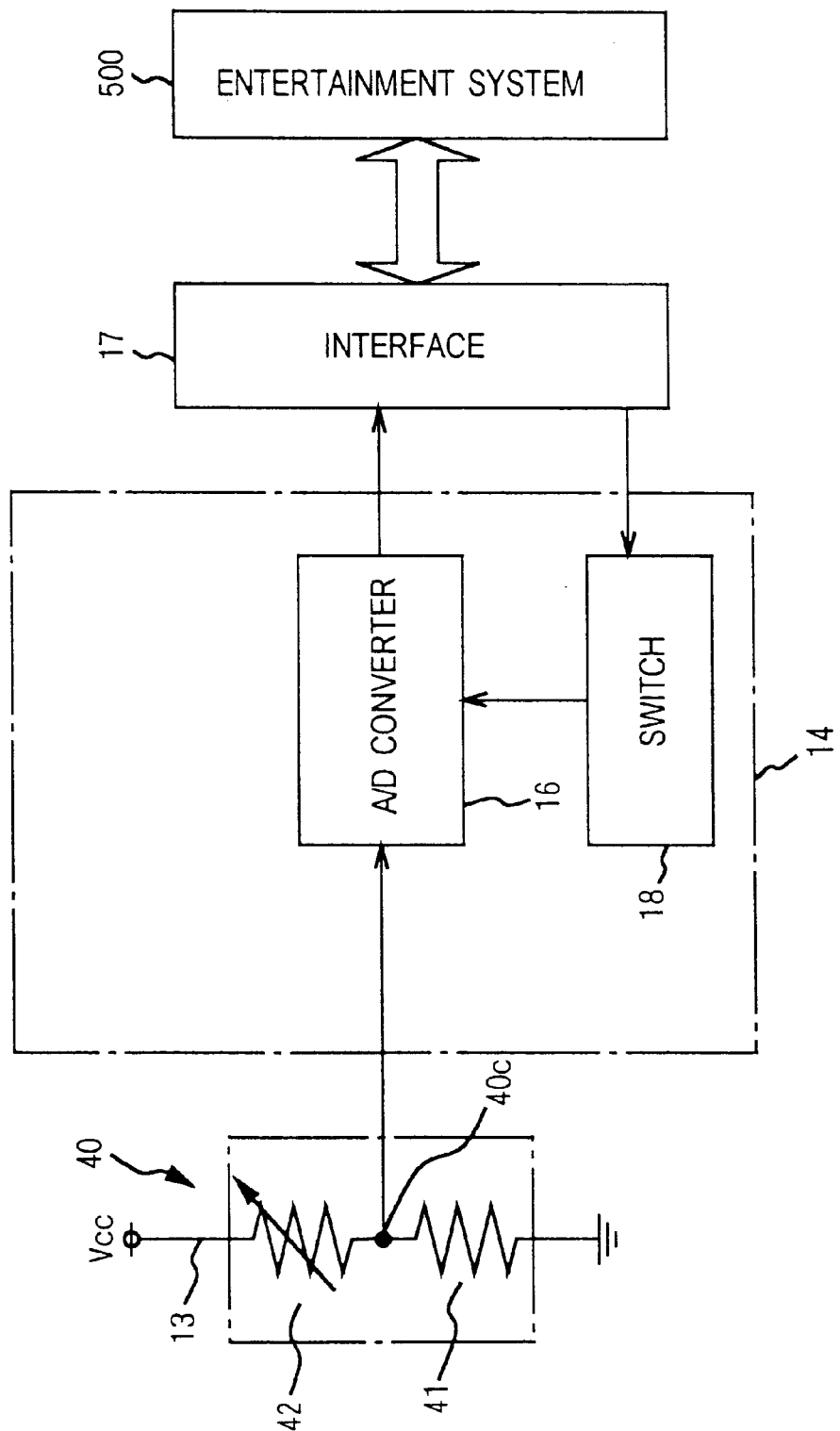
FIG. 12 is a block diagram of the main parts of the controller.

FIG. 12 is a block diagram showing the main parts of the controller 200.

An MPU 14 mounted on the internal board of the controller 200 is provided with a switch 18, an A/D converter 16. The analog signal (voltage) output from the output terminal 40c of the resistor 40 is provided as the input to the A/D converter 16 and is converted to a digital signal.

The digital signal output from the A/D converter 16 is sent via an interface 17 provided upon the internal board of the controller 200 to the entertainment system 500 and the actions of game characters and the like are executed based on this digital signal.

Changes in the level of the analog signal output from the output terminal 40c of the resistor 40 correspond to changes in the pushing pressure received form the control button 221 (control element) as described above. Therefore, the digital signal outputted from the A/D converter 16 corresponds to the pushing pressure on the control button 221 (control element) from the user. If the actions of the game characters and the like are controlled based on the digital signal that has such a relationship with the pushing pressure from the user, it is possible to achieve smoother and more analog-like action than with control based on a binary digital signal based only on zeroes and ones.

The configuration is such that the switch 18 is controlled by a control signal sent from the entertainment system 500 based on a game program recorded on an optical disc 411. When a game program recorded on optical disc is executed by the entertainment system 500, depending on the content of the game program, a control signal is provided as output to specify whether the A/D converter 16 is to function as a means of providing output of a multi-valued analog signal, or as a means of providing a binary digital signal. Based on this control signal, the switch 18 is switched to select the function of the A/D converter 16.

Figure 13:
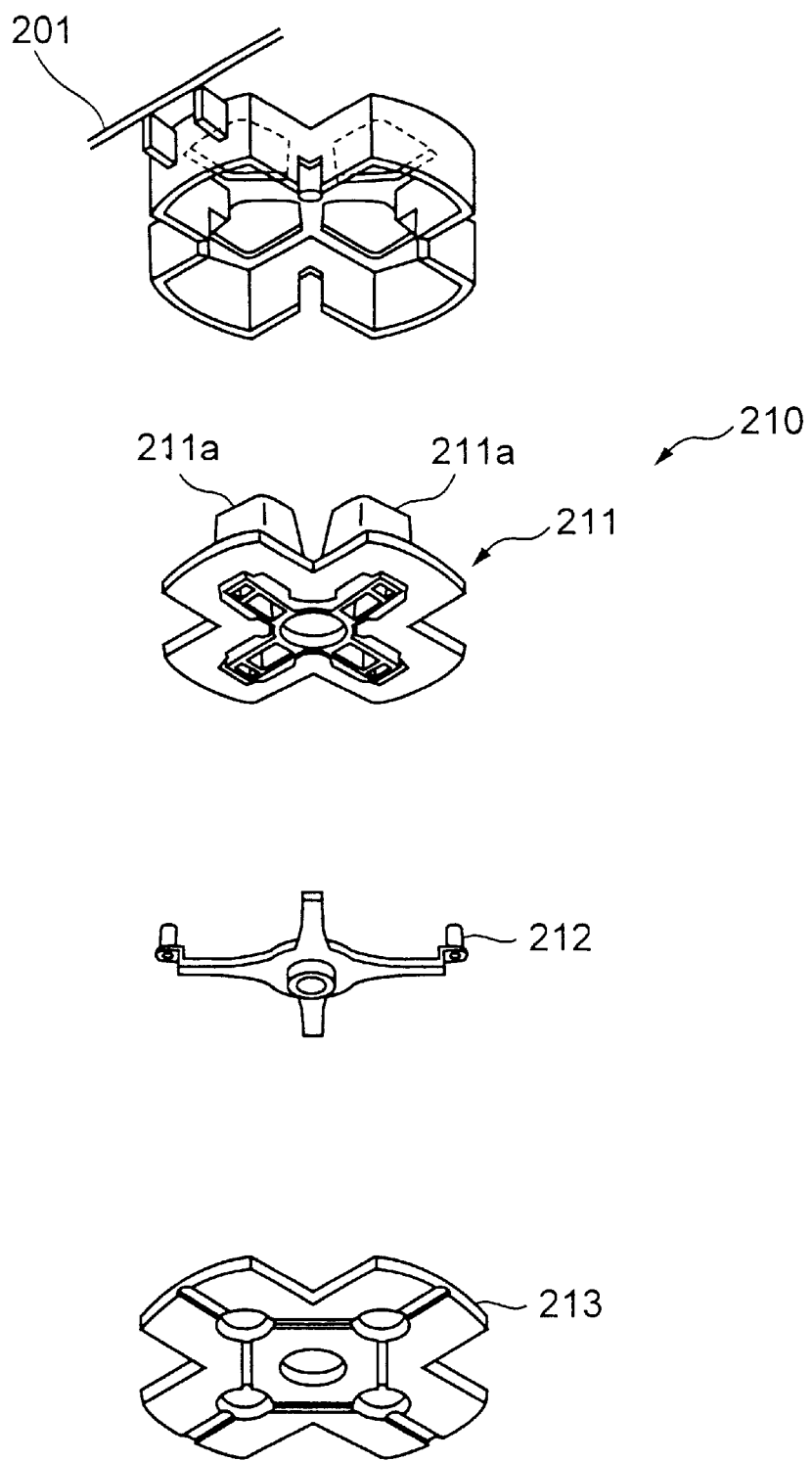
FIG. 13 is an exploded perspective view of the first control part of the controller.
Figure 14:
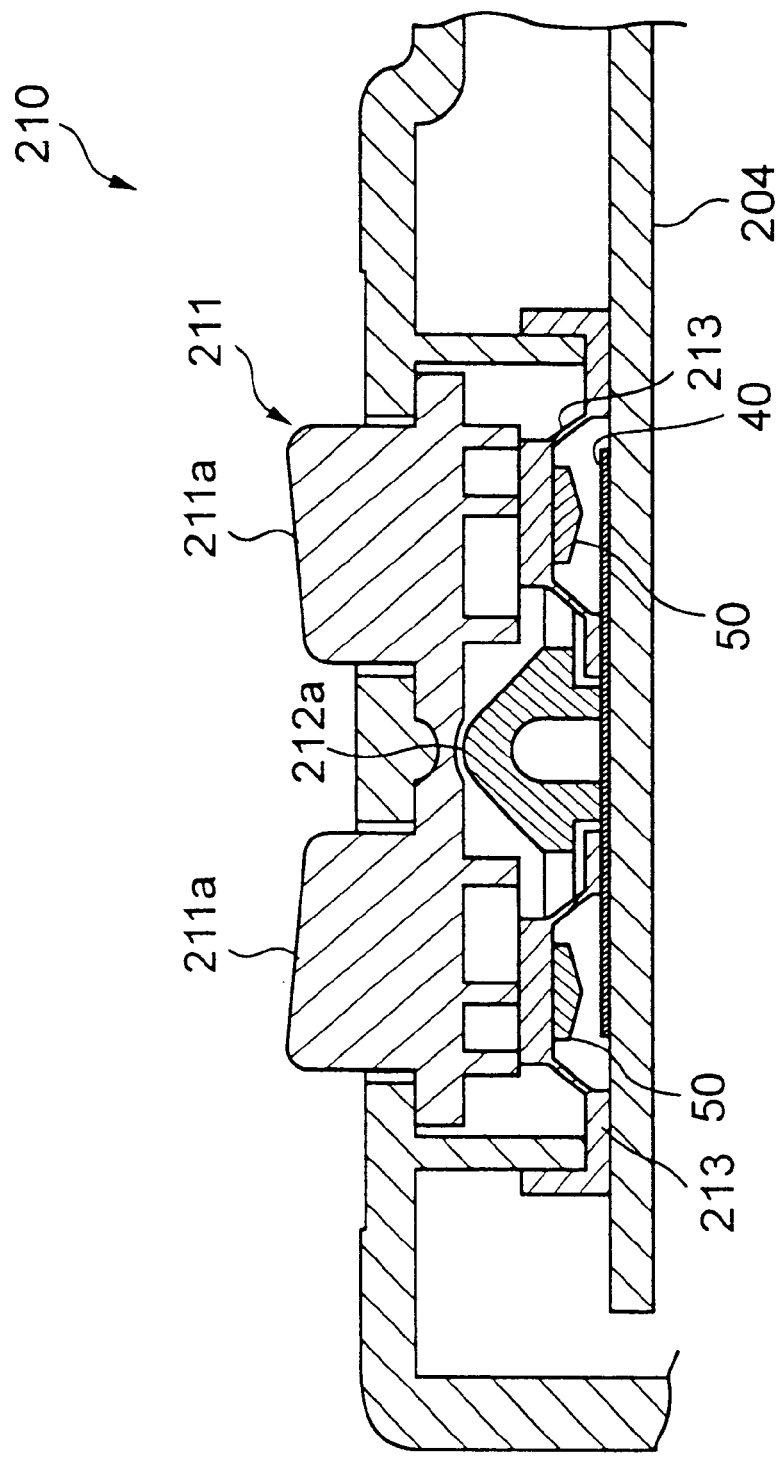
FIG. 14 is a cross section of the first control part of the controller of FIG. 13.

FIGS. 13 and 14 show a configuration of the first control part of the controller.

As shown in FIG. 13, the first control part 210 includes a cruciform control unit 211, a spacer 212 that positions this control unit 211, and an elastic body 213 that elastically supports the control unit 211. Moreover, as shown in FIG. 13, a conducting member 50 is attached to the rear surface of the elastic body 213, and the configuration is such that resistors 40 are disposed at the positions facing the individual control keys 211a (control elements) of the control unit 211 via the elastic body 213.

The overall structure of the first control part 210 has already been made public knowledge in the publication of unexamined Japanese patent application No. JP-A-H8-163672. The control unit 211 uses a hemispherical projection 212a formed in the center of the spacer 212 as a fulcrum, and the individual control keys 211a (control elements) are assembled such that they can push on the resistor 40 side (see FIG. 14).

Conducting members 50 are adhered to the inside of the top surface of the elastic body 213 in positions corresponding to the individual control keys 211a (control elements) of the cruciform control unit 211. In addition, the resistors 40 with a single structure are disposed such that they face the individual conducting members 50.

When the individual control keys 211a which are control elements are pushed, the pushing pressure acts via the elastic body 213 on the pressure-sensitive devices consisting of a conducting member 50 and resistor 40, so that its electrical resistance value varies depending on the magnitude of the pushing pressure.

Figure 15:
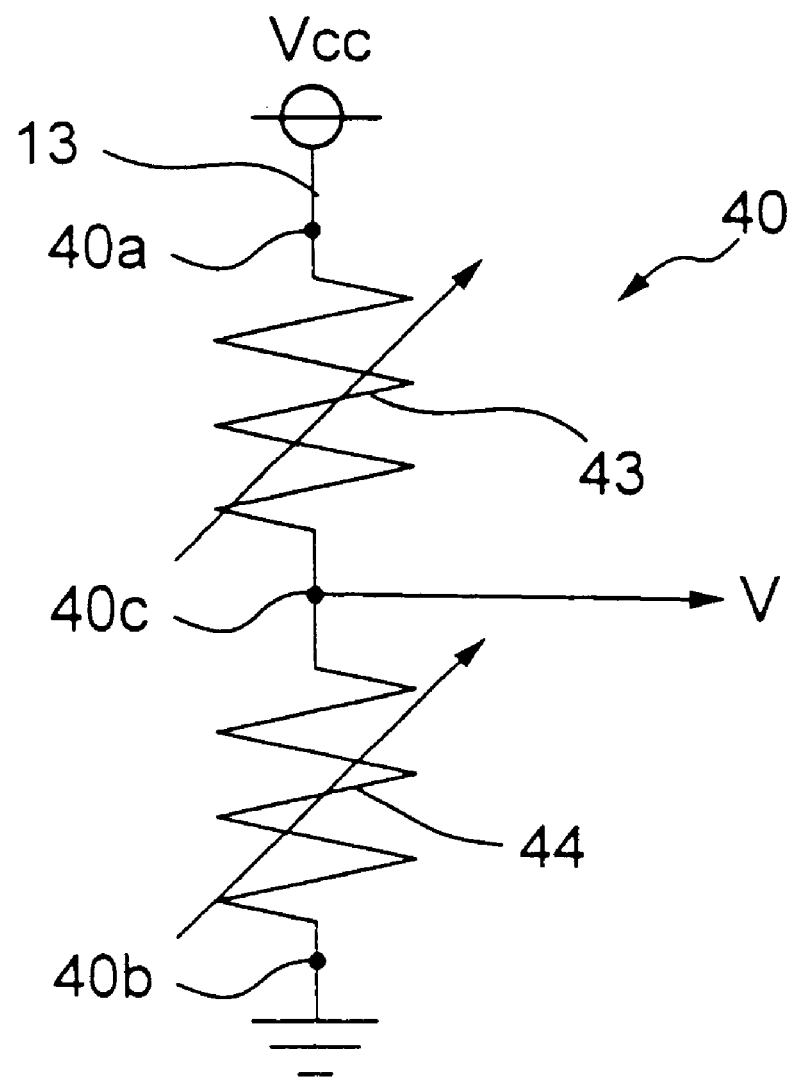
FIG. 15 is a diagram showing the circuit configuration of a resistor.

FIG. 15 is a diagram showing the circuit configuration of the resistor. As shown in this diagram, the resistor 40 is inserted in series in a power supply line 13, where a voltage is applied between the electrodes 40a and 40b. The resistance of this resistor 40 is illustrated schematically, as shown in this diagram; the resistor 40 is divided into first and second variable resistors 43 and 44.

Among these, the portion of the first variable resistor 43 is in contact, respectively, with the conducting member 50 that moves together with the control key (up directional key) 211a for moving the character in the up direction, and with the conducting member 50 that moves together with the control key (left directional key) 211a for moving the character in the left direction, so its resistance value varies depending on the surface area in contact with these conducting members 50.

In addition, the portion of the second variable resistor 44 is in contact, respectively, with the conducting member 50 that moves together with the control key (down directional key) 211a for moving the character in the down direction, and with the conducting member 50 that moves together with the control key (right directional Key) 211a for moving the character in the right direction, so its resistance value varies depending on the surface area in contact with these conducting members 50.

Moreover, an output terminal 40c is provided intermediate between the variable resistors 43 and 44, and an analog signal corresponding to the pushing pressure on the individual control keys 211a (control elements) is providing as output from this output terminal 40c.

The output from the output terminal 40c can be calculated from the ratio of the split in resistance value of the first and second variable resistors 43 and 44. For example, if R1 is the resistance value of the first variable resistor 43, R2 is the resistance value of the second variable resistor 44 and $V_{cc}$ is the power supply voltage, then the output voltage V appearing at the output terminal 40c can be expressed by the following equation.

$$V = V_{cc} \times R2/(R1+R2)$$

Therefore, when the resistance value of the first variable resistor 43 decreases, the output voltage increases, but when the resistance value of the second variable resistor 44 decreases, the output voltage also decreases.

Figure 16:
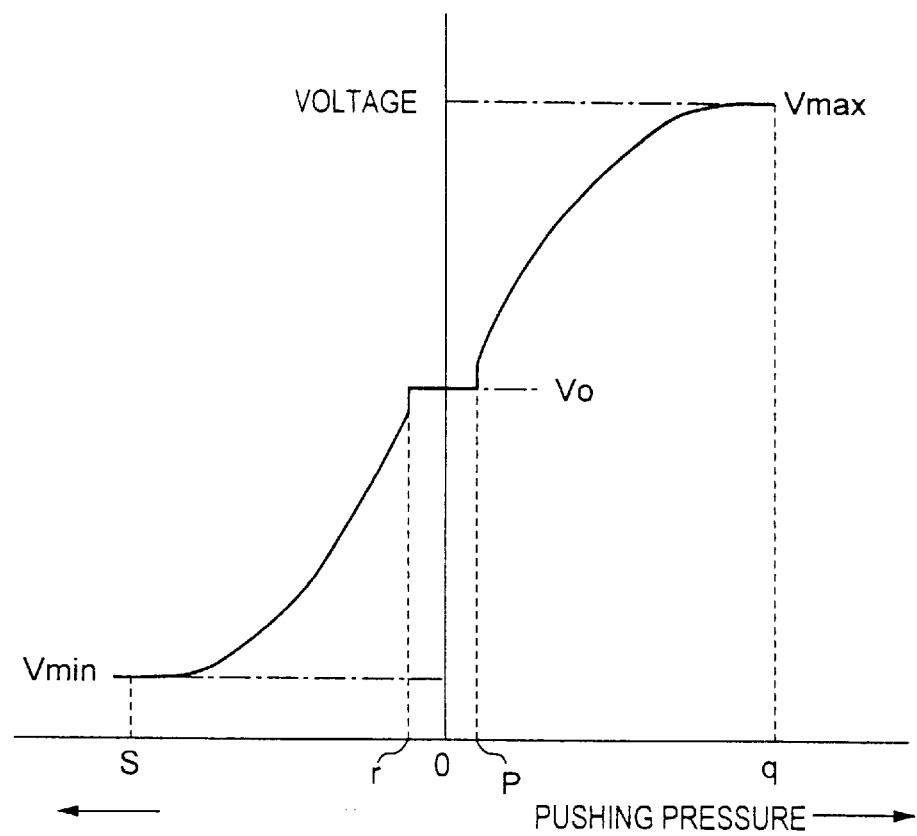
FIG. 16 is a graph showing the characteristic of the signal output.

FIG. 16 is a graph showing the characteristic of the analog signal (voltage) outputted from the output terminal of the resistor.

First, since a voltage is applied to the resistor 40 when the power is turned on, even if the individual control keys 211a of the control unit 211 are not pressed, a fixed analog signal (voltage) $V_0$ is provided as output form the output terminal 40c (at position 0 in the graph). Next, even if one of the individual control keys 221a is pressed, the resistance value of this resistor 40 does not change until the conducting member 50 contacts the resistor 40, and the output from the resistor 40 remains unchanged at $V_0$.

Furthermore, if the up-directional key or left-directional key is pushed until the conducting member 50 comes into contact with the first variable resistor 43 portion of the resistor 40 (at position p in the graph), thereafter the surfaced area of contact between the conducting member 50 and the first variable resistor 43 portion increases in response to the pushing pressure on the control key 221a (control elements), and thus the resistance of that portion is reduced so the analog signal (voltage) output from the output terminal 40c of the resistor 40 increases. Furthermore, the analog signal (voltage) output form the output terminal 40c of the resistor 40 reaches the maximum $V_{max}$ when the conducting member 50 is most deformed (at position q in the graph).

On the other hand, if the down-directional key or right-directional key is pushed until the conducting member 50 comes into contact with the second variable resistor 44 portion of the resistor 40 (at position r in the graph), thereafter the surface area of contact between the conducting member 50 and the second variable resistor 44 portion increases in response to the pushing pressure on the control key 211a (control elements), and thus the resistance of that portion is reduced, and as a result, the analog signal (voltage) output from the output terminal 40c of the resistor 40 decreases. Furthermore, the analog signal (voltage) output form the output terminal 40c of the resistor 40 reaches the minimum $V_{min}$ when the conducting member 50 is most deformed (at position s in the graph).

Figure 17:
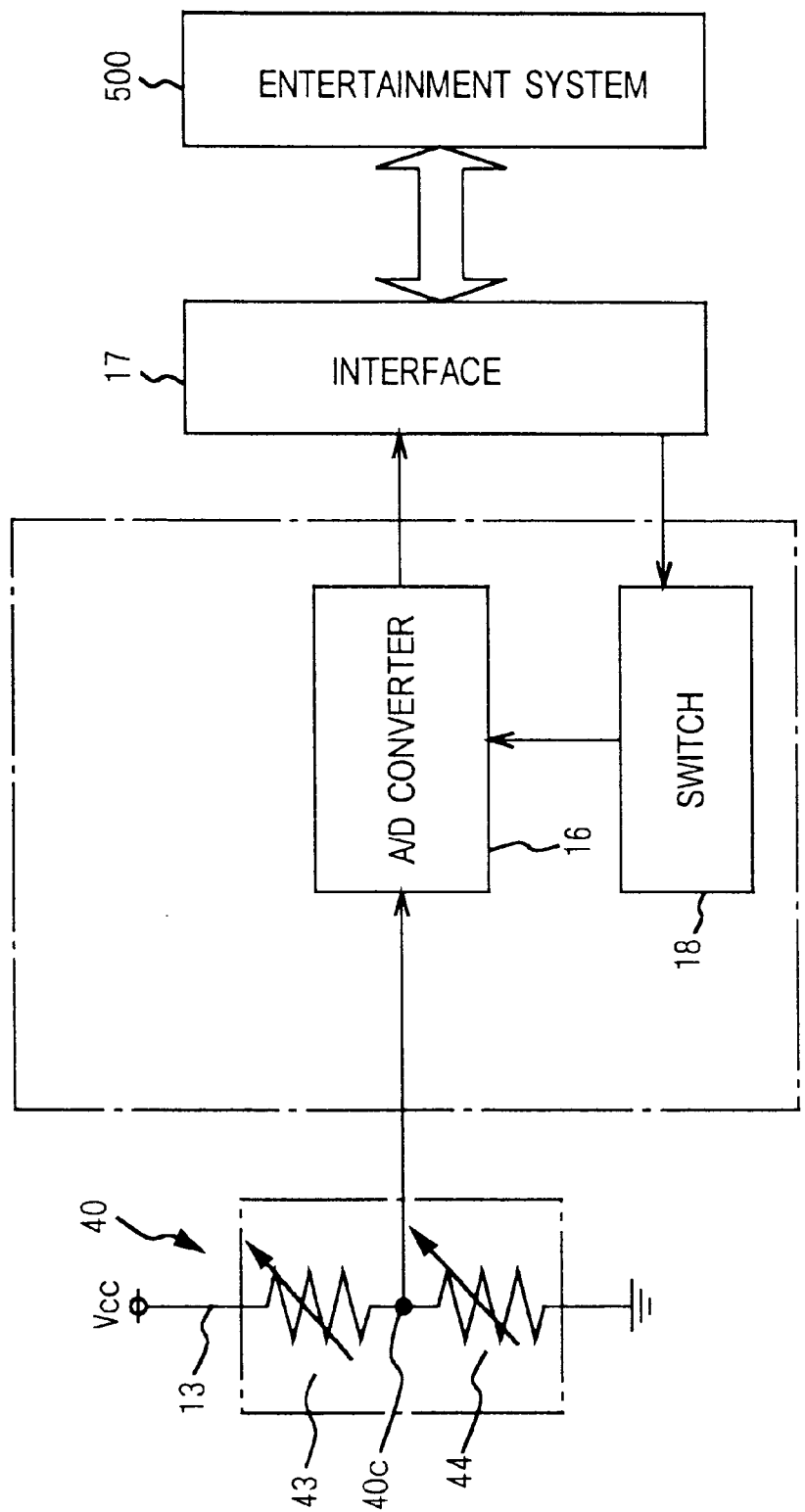
FIG. 17 is a block diagram showing the overall constitution including the resistor.

As shown in FIG. 17, the analog signal (voltage) output from the output terminal 40c of the resistor 40 is provided as input to an A/D converter 16 and converted to a digital signal. Note that the function of the A/D converter 16 is shown in FIG. 17 is as described previously based on FIG. 12, so a detailed description shall be omitted here.

Figure 18:
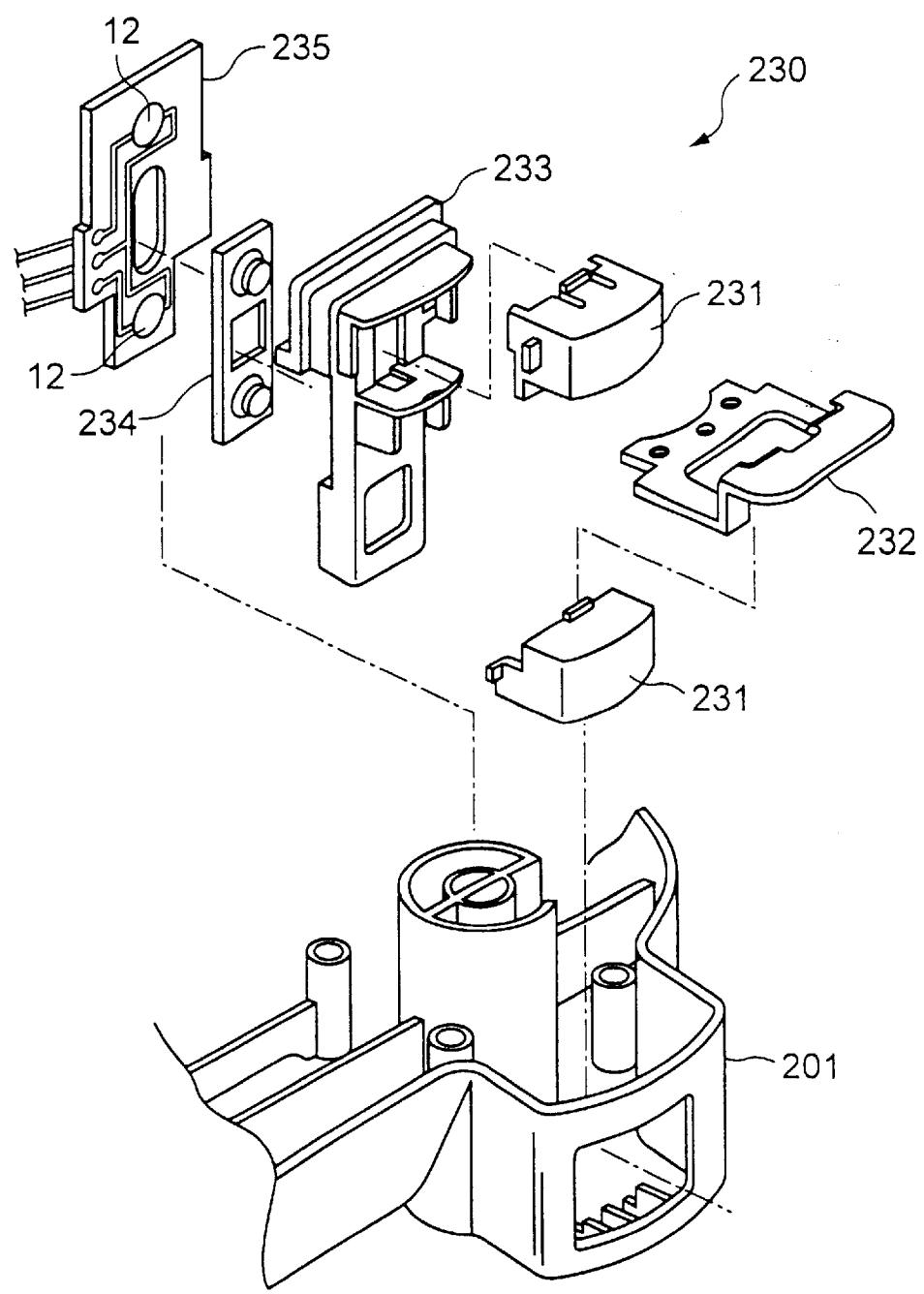
FIG. 18 is an exploded perspective view of the third control part of the controller.

FIG. 18 is an exploded perspective view of the third control part of the controller.

The third control part 230 includes two control buttons 231, a spacer 232 for positioning these control buttons 231 within the interior of the controller 200, a holder 233 that supports these control buttons 231, an elastic body 234 and an internal board 235, having a structure wherein resistors 40 are attached to appropriate locations upon the internal board 235 and conducting members 50 are attached to the rear surface of the elastic body 234.

The overall structure of the third control part 230 also already has been made public knowledge in the publication of unexamined Japanese patent application No. JP-A-H8-163672, so a detailed description thereabout will be omitted. The individual control buttons 231 can be pushed in while being guided by the spacer 232, the pushing pressure when buttons 231 are pressed acts via the elastic body 234 on the pressure-sensitive device consisting of a conducting member 50 and resistor 40.

The electrical resistance value of the pressure-sensitive device varies depending on the magnitude of the pushing pressure it receives.

It is noted that the fourth control part 240 has the same structure as that of the third control part 230 described above.

Within the above description, FIG. 5 shows a flowchart for setting parameter values. This program may be supplied either recorded alone upon an optical disc or other recording medium, or recorded on the recording medium together with the game software as part of the game software. This program is run by the entertainment system 500 and executed by its CPU.

Here, the meaning of supplying the program for setting parameter values recorded individually on a recording medium has the meaning of preparing it in advance as a library for software development. As is common knowledge, at the time of developing software, writing all functions requires an enormous amount of time.

However, if the software functions are divided by the type of functions, for example, for moving objects and the like, they can be used commonly by various types of software, so more functions can be included. To this end, a function such as that described in this preferred embodiment that can be used commonly may be provided to the software manufacturer side as a library program. When general functions like this are supplied as external programs in this manner, it is sufficient for the software manufacturers to write only the essential portions of the software.

While an embodiment was described above, the present invention may also assume the following alternative embodiments. In the embodiment, the pressure-sensing value as pushed by the user is used as is. However, in order to correct for differences in the body weights of users or differences in how good their reflexes are, it is possible to correct the maximum value of the user pressure-sensing value to the maximum game pressure-sensing value set by the program, and intermediate values may be corrected proportionally and used. This type of correction is performed by preparing a correction table. In addition, the user pressure-sensing value can be corrected based upon a known function. Moreover, the maximum value of the user pressure-sensing value rate of change may be corrected to the maximum game pressure-sensing value rate of change set in the program, and intermediate values can be proportionally corrected and used. For more details about this method, refer to the present inventors' Japanese patent application No. 2000-40257 and the corresponding PCT application JP/(Applicant file reference No. SC00097WO00).

Due to this invention, the changing of various parameters on an LCD panel or the screen of a computer by the pushing of a simple ON/OFF switch or holding it down can be made an easier-to-use interface for the user.

Moreover, due to this invention, values are set depending on pressure-sensing values, so it is possible to improve the user interface compared to selection by a simple ON/OFF switch.

What is claimed is:

1. Electronic equipment comprising:

pressure sensitive means;

a switch connected to said pressure-sensitive means;

a processing circuit that performs processing depending on a value of a pressure-sensing output signal of said switch; and display means that displays the results of processing of said processing circuit;

wherein said processing circuit changes a settings of an operating parameter in the electronic equipment by referencing a conversion table that correlates each of a plurality of settings for the operating parameter with one of a plurality of values for the pressure-sensing output signal.

2. The electronic equipment according to claim 1, wherein a setting is changed in increments that depend on the magnitude of the output value of said switch.

3. The electronic equipment according to claim 1, wherein said electronic equipment is an entertainment system.

4. The electronic equipment according to claim 1, wherein said electronic equipment is a video camera.

5. A recording medium on which is recorded a computer-readable and executable software program that performs processing in a device by taking as instructions an output from a controller which has pressure-sensitive means, wherein said software program changes settings of parameters in said device, wherein said software program includes a conversion table that correlates each of a plurality of selectable settings for an operating parameter of said device with one of a plurality of values of the pressure-sensing output signal.

6. The recording medium according to claim 5, wherein a setting is changed in increments that depend on the magnitude of the output value of said switch.

7. A method of changing settings of parameters of electronic equipment, comprising the steps of:

providing pressure-sensitive means;

sensing a pushing pressure of a user of the electronic equipment by said pressure-sensitive means;

generating a pressure-sensing output signal corresponding to said pushing pressure;

selecting one of a plurality of settings for a selected parameter based on said pressure-sensing output signal by referencing a conversion table, wherein said conversion table correlates each of the plurality of settings with a magnitude of one of a plurality of pressure-sensing output signals;

changing the setting for the selected parameter; and displaying the changed value of the setting on a monitor of electronic equipment.

8. The electronic equipment according to claim 7, wherein the parameter setting corresponds to a maximum output value observed during an operation of said switch.

9. The recording medium according to claim 6, wherein a setting is changed to a parameter setting corresponding to one of a plurality of output values of the controller.

10. The recording medium according to claim 9, wherein the parameter setting corresponds to a maximum output value of the controller.

11. The method according to claim 7, wherein a setting is changed to a parameter setting corresponding to one of a plurality of output values of the pressure-sensing output signal.

12. The method according to claim 9, wherein the parameter setting corresponds to a maximum value of the pressure-sensing output signal.

13. Electronic equipment comprising:
pressure-sensitive means;
a switch connected to said pressure-sensitive means;
a processing circuit that performs processing depending on an output value of said switch; and
display means that displays the results of processing of said processing circuit;
wherein said processing circuit selects a new setting from one of a plurality setting for an operating parameter of the electronic equipment according to a new output value of said switch by referencing a conversion table that correlates each of the plurality of settings with one of a plurality of output values for the controller, and changes a current parameter setting of the electronic equipment to the new parameter setting.

14. The electronic equipment according to claim 13, wherein the new parameter setting is determined from an entry in a conversion table of the processing circuit that is correlated with the new output value.

15. The electronic equipment according to claim 13, wherein the processing circuit changes the current parameter setting to the new parameter setting only when the new output value exceeds a previous output value.

16. The electronic equipment according to claim 13, wherein the display means displays the new parameter setting.

17. A recording medium on which is recorded a computer-readable and executable software program that performs processing in a device by taking as instructions an output from a controller which has pressure-sensitive means;
Wherein said software program operates to select a new setting from one of a plurality of settings for an operating parameter of the device according to a new output value of said controller and to change a current parameter setting of the device to the new parameter setting, wherein said software program includes a conversion table that correlates each of the plurality of settings with one of a plurality of output values for the controller.

18. The recording medium according to claim 17, wherein the software program changes the current parameter setting to the new parameter setting only when the new output value exceeds a previous output value.

19. The recording medium according to claim 17, wherein the software program further operates to display the new parameter setting.

20. A method for determining a parameter setting for electronic equipment, comprising the steps of:
providing a pressure-sensitive means;
sensing a pushing pressure of a user of the electronic equipment by said pressure-sensitive means;
generating a pressure-sensing output signal corresponding to said pushing pressure;
selecting a new setting from one of a plurality of settings for an operating parameter of the electronic equipment according to a new output value of said pressure-sensing output signal, wherein each of the plurality of settings is correlated with one of a plurality of output values for the controller in a conversion table; and
changing a current parameter setting of the electronic equipment to the new parameter setting.

21. The method of claim 20, further comprising the step of displaying the new parameter setting.

22. The method of claim 20, wherein the changing step changes current parameter setting to the new parameter setting only when the new output value exceeds a previous output value.

* * * * *